United States Patent [19]
Beduchaud

[11] 3,729,248
[45] Apr. 24, 1973

[54] OPTICAL SCANNING ASSEMBLY WITH HELICAL-SHAPED ROTATING REFLECTOR

[75] Inventor: Michel Beduchaud, Massy, France

[73] Assignee: Compagnie Industrielle Des Telecommunications CIT-ALCATEL, Paris, France

[22] Filed: June 24, 1971

[21] Appl. No.: 156,400

[30] Foreign Application Priority Data

June 26, 1970 France..................................7023868

[52] U.S. Cl. ...........................350/7, 95/4.5, 178/7.6
[51] Int. Cl. ...................................................G02b 17/00
[58] Field of Search.........................350/7, 6, 285; 178/7.6; 250/234, 235, 236; 95/4.5

[56] References Cited

UNITED STATES PATENTS 3,523,160  8/1970  Willey ..................................178/7.6
3,618,487  11/1971  Tiefenthal et al. ......................95/4.5

Primary Examiner—Ronald L. Wibert
Assistant Examiner—Michael J. Tokar
Attorney—Craig, Antonelli & Hill

[57] ABSTRACT

An optical scanning assembly employs a reflector constructed in the form of a cylindrical helix which is rotatable about the axis of the helix. A light source is arranged to direct a collimated beam of light parallel to the helix axis, so that the light beam strikes a first reflective surface of the reflector. Depending upon the angle of the reflective surface of the reflector with respect to a radial line of the cylinder, the beam of light from the light source will be deflected away from the axis of the cylinder in a predetermined direction. The light then strikes a desired surface and may be reflected therefrom into the photo-sensitive element for further processing. Because of the rotation of the helix-shaped reflector, the light beam from the light source is scanned back and forth along the line parallel to the helix axis.

10 Claims, 8 Drawing Figures

Patented April 24, 1973

INVENTOR
MICHEL BEDUCHAUD

BY Craig, Antonelli & Hill
ATTORNEYS

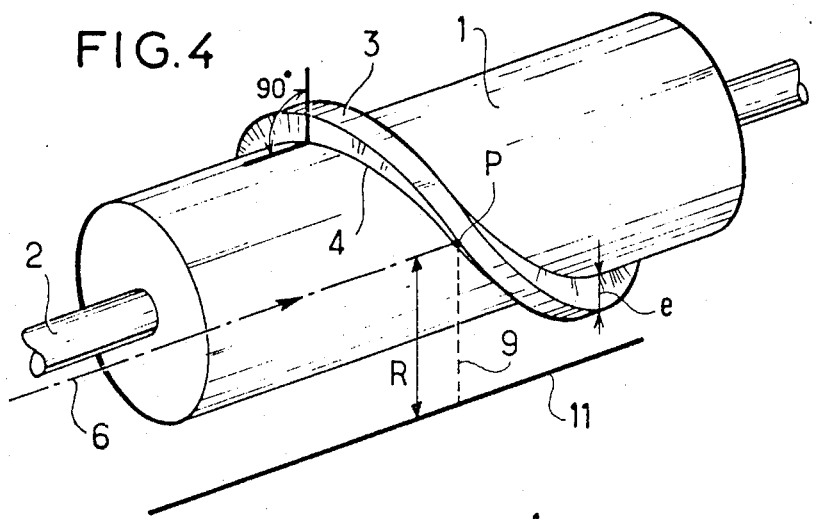
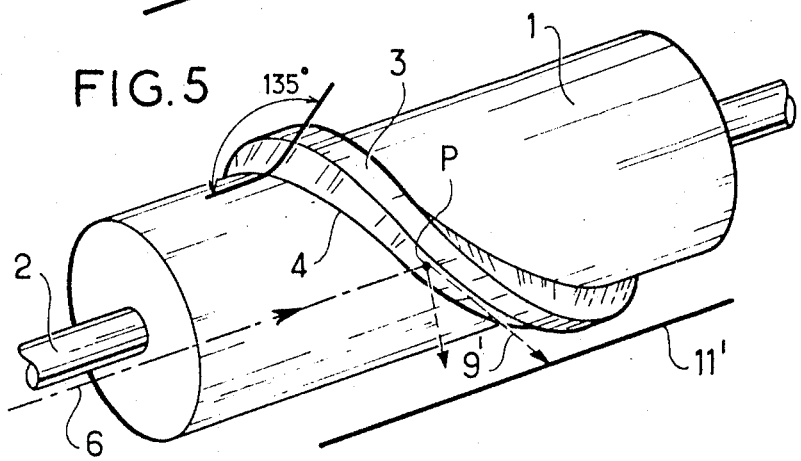
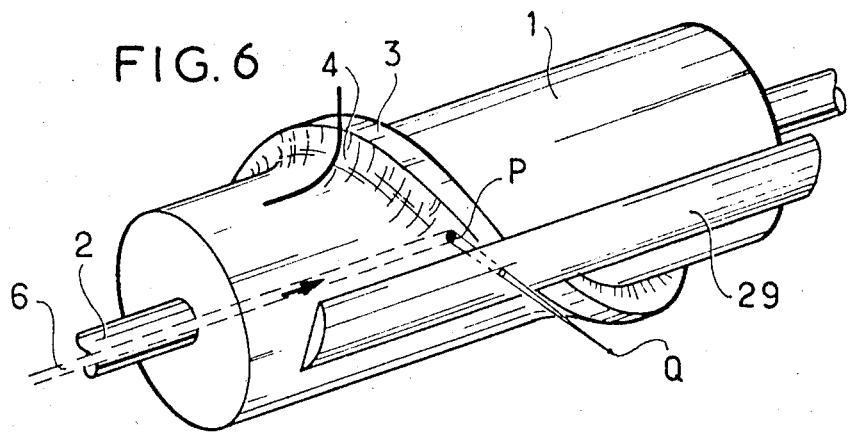

OPTICAL SCANNING ASSEMBLY WITH HELICAL-SHAPED ROTATING REFLECTOR

The present invention is directed to optical scanning assemblies. It provides a mechanically simple arrangement for rectilinearly scanning a light beam at constant speed. Principle applications of the assembly will be in the field of facsimile links.

In facsimile apparatus, it is often required to scan a light spot back and forth along a straight line at constant speed. This is either to read a document or image to be transmitted, in which case light reflected from the document or image is converted into an electrical signal by an appropriate transducer, or to scan photosensitive paper with a light beam modulated by a received facsimile signal.

Scanning assemblies using optical fibers have already been proposed. In such systems, the rectilinear scan is obtained by means of a static optical unit comprising a multiplicity of fibers linked to a distribution fiber. The proposed solutions are relatively complicated and as yet relatively expensive. To simplify such drawbacks, the present invention is intended as one of its objects, to provide an improved optical scanning assembly.

It is another object of the present invention to provide a scanning assembly capable of reproducing a document within a minimum amount of equipment.

It is yet another object of the present invention to provide an improved scanning assembly capable of scanning a document at a desired angle.

In accordance with the invention, an optical scanning assembly comprises a reflector constructed as a cylindrical helix rotatable about a helix axis, and a light source arranged to direct a collimated light beam parallel to the helix axis to strike a first reflective surface of the reflector so that the beam is deflected away from the axis and, on rotation of the reflector, is scanned back and forth along a line parallel to the helix axis.

The invention will now be described in more detail, by way of examples only and with reference to the accompanying diagrammatic drawings in which:

FIGS. 4 to 6 are simplified perspective views of three forms of the reflector for the assembly.

Figure 1:
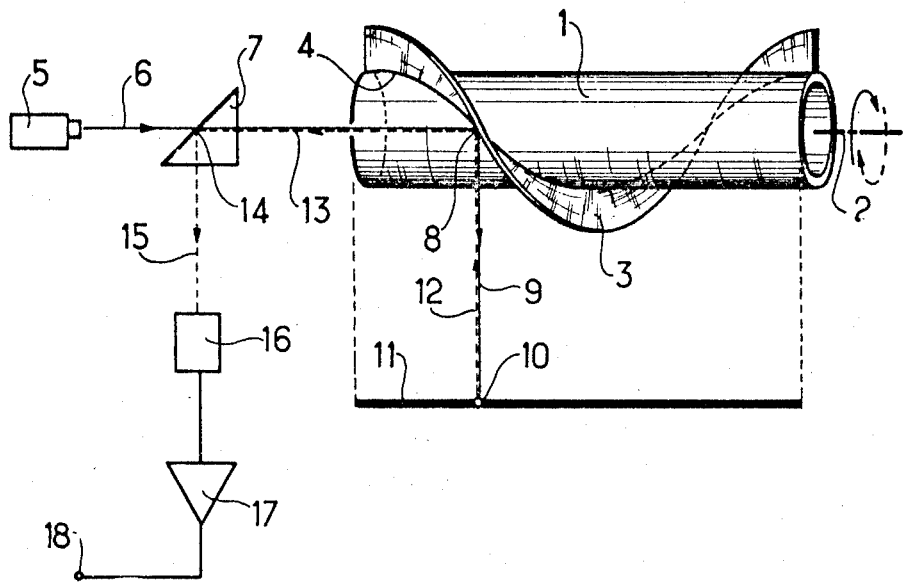
FIGS. 1 and 2 show two forms of scanning assembly for use in facsimile transmission.

Referring to FIG. 1, a cylindrical core 1 is rotatable about its axis 2 by a drive system (not shown). On its external surface the core 1 carries a reflector 3 in the form of a cylindrical helix. The reflector makes one circuit of the core circumference and comprises a flat reflective strip, any transverse line on which lies along a radius of the cylindrical core 1. The reflector 3 is fastened to the core 1 along a helical line indicated at 4.

A light source 5 is arranged to direct a collimated light beam 6 parallel to the helix axis and through a totally reflecting prism 7 to strike the reflector 3 at 8. The helix angle is such that the reflected beam 9 is at right angles to the incident beam 6. The incident beam 6 is undeviated by the prism 7, being merely shifted laterally by a negligible amount.

The deflected beam 9 strikes a point 10 on a document 11. If the point of impact 10 is reflective, the beam is reflected back along the dotted line 12 to strike the reflector 3 at the point 8, so that it returns along the dotted line 13 towards the light source 5. The reflected light thus follows the same path as the incident beam.

However, the reflected beam 13 is turned through an angle of 90° by the prism 7, to pass along dotted line 15 to a photo-sensitive element 16. The output of element 16 is amplified by an amplifier 17 and passed to an output terminal 18 which may, for example, be connected to a modulator for transmission of an electrical signal corresponding to the amount of light reflected from point 10.

As the reflector rotates about the axis 2, the deflected beam 9 is scanned back and forth along a line on the document 11 parallel to the helix axis 2. If the document 11 is moved perpendicularly to the axis 2 at a rate related to the speed of rotation of the reflector, the document is scanned in faster fashion by the beam 9. The electrical signal obtained at terminal 18 is thus representative of the variation in tonal quality of the information carried by the document 11. Depending on whether any particular point on the document is brighter or darker than a limit, the amplitude of the electrical signal will exceed or be less than a particular value.

Figure 2:
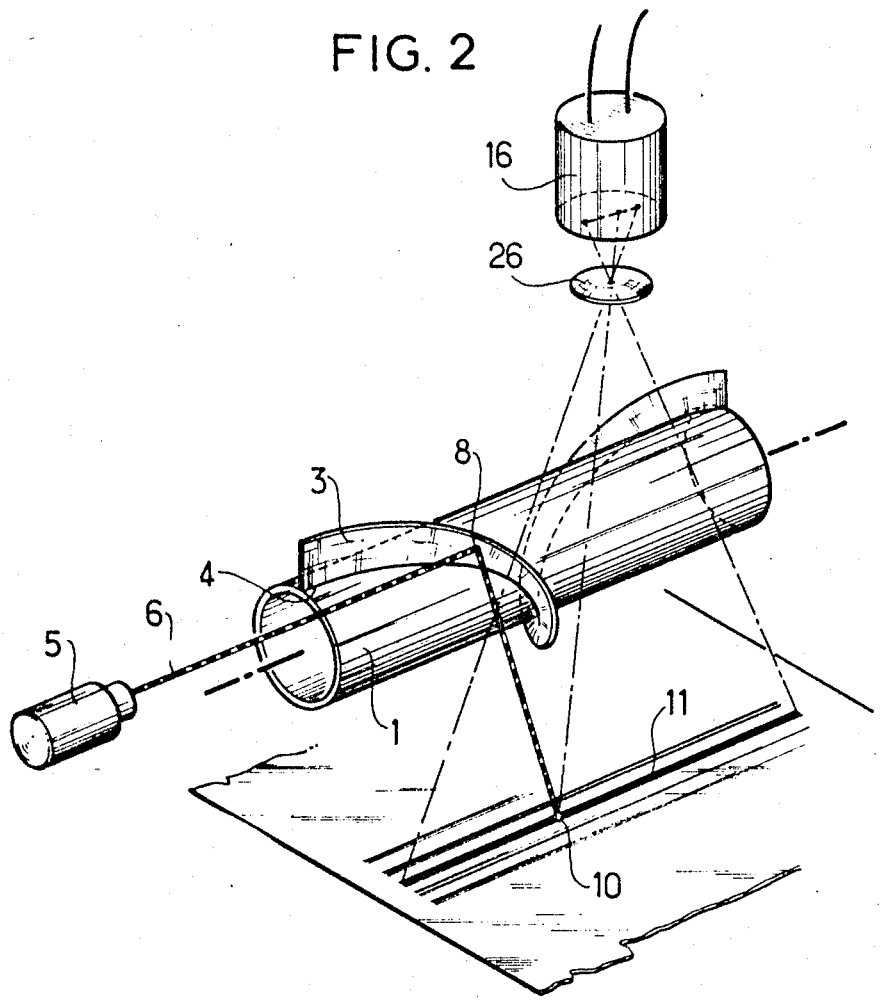

Referring to FIG. 2, in which elements also appearing in FIG. 1 carry the same references, instead of being returned along the same path as the incident beam, light reflected from point 10 on the document 11 may be collected by a lens 26 and concentrated onto the photo-sensitive element 16. Otherwise the operation of the system is identical to that of FIG. 1.

Figure 3:
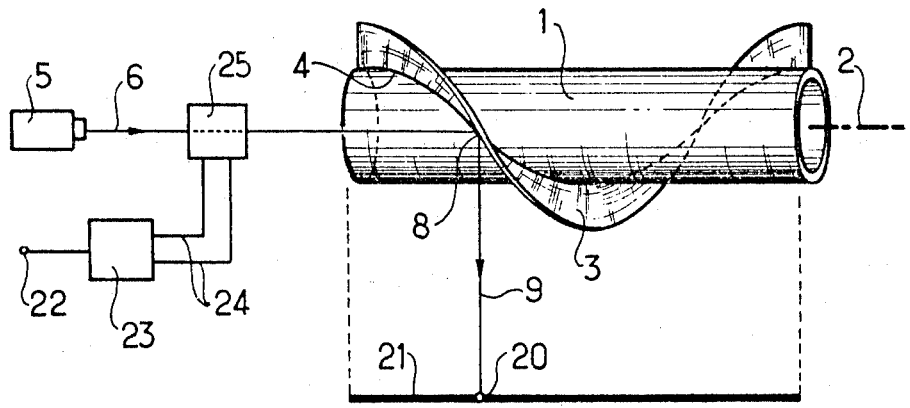
FIG. 3 shows a scanning assembly for use in facsimile reception.

Referring to FIG. 3, in which elements analogous to those of FIGS. 1 and 2 again carry the same references, a light source 5 directs a parallel light beam 6 parallel to the helix axis 2 and through a modulator 25. The beam 6 strikes the reflector 3 at 8 and the deflected beam 9 strikes a point 20 on a photo-sensitive material 21. The modulator 25 may be a Kerr cell or a Pockels cell, or such other modulator as will suggest itself to those skilled in the art.

A facsimile signal representative of the tonal variations of a document to be reproduced is applied to an input terminal 22 of amplification circuitry 23 whose output controls the modulator 25. As the reflector 3 rotates about its axis 2, and as the photo-sensitive material 21 is moved perpendicularly to the axis 2 at a speed related to the speed of rotation of the reflector, the modulated light beam is scanned in raster fashion across the material 21, each point on which is marked according to the instantaneous luminous intensity of the modulated beam. The image to be reproduced is thus built up on the material 21.

It will be appreciated that in each of the optical scanning assemblies so far described, the length of the optical path traversed by the respective light beams continually varies, the variation being equal to twice the length of the cylinder 1. For this reason the light source 5 is preferably a laser, and in any case should provide a collimated light beam.

In the assemblies so far described, each scan line is produced by one rotation of the cylinder 1. It will be appreciated that more than one line may be traced on each rotation, by using the appropriate number of helicoidal mirrors with reduced angular extension.

Three forms of the reflector will now be described in more detail, with reference to FIGS. 4 to 6.

In FIG. 4, the reflector 3 consists of a reflective strip wound in helix fashion around the circumference of the cylindrical core 1, a first reflective face, that directed towards the left in the figure, being plane and a line on that surface passing through the helix axis 2 being perpendicular to the axis.

The incident beam 6 strikes point P on the reflector 3 and then strikes the document 11. It will be immediately appreciated that the shortest possible distance between point P and the document 11 is $R + e$ where $R$ is the radius of the core 1 and $e$ is the radial dimension of the reflector 3.

In FIG. 5, the reflector strip 3 is shaped so that a line on its first reflective surface passing through the helix axis is inclined to the helix axis at an obtuse angle of 135°. The beam incident at point P is no longer deflected perpendicularly to its initial direction, but passes along a path 9' which moves rapidly away from the cylinder 1. It is thus possible for the document, shown at 11', to be placed much closer to the point of impact P.

As the reflective surface of the reflector is unlikely to be optically perfect, any faults are more noticeable as the distance between the point of impact P and the document 11 increases, by reason of an "optical lever effect". In FIG. 5, the optical lever is much shorter than that of FIG. 4, for example the ratio may be reduced to 4:1 with respect to FIG. 4, so that the light spot on the document 11 can be made much finer.

In FIG. 6, the first reflective surface of the strip 3 is concave, so that the deflected beam is convergent. The focusing may be improved by arranging a convex cylindrical lens 29 parallel to the reflector axis 2 so that the deflected beam passes through the lens at all points on its scanning path. With this arrangement, the beam may be focused to a very fine spot Q.

Figure 7:
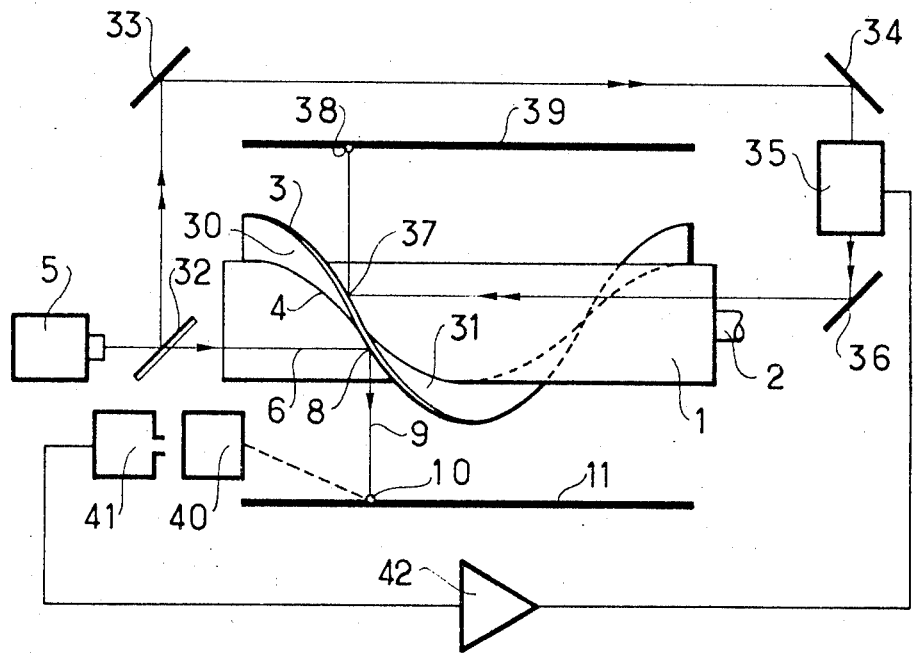
FIGS. 7 and 8 show further forms of the scanning assembly.

In the optical scanning assembly of FIG. 7, the reflector strip 3 has two reflective surfaces, a first surface 30 directed towards the left as seen in the figure and a second surface 31 directed in the opposite direction.

A light source 5 provides a beam 6 parallel to the reflector axis 2 and which passes through a semi-reflecting mirror 32 before striking the first face 30 of the reflector 3, by which it is deviated to strike point 10 on a document 11, light reflected from the point of impact being collected by an optical system 40 and directed onto a photo-sensitive element 41.

Part of the beam 6 is deflected by the mirror 32 and along a path shown by double-headed arrows by further mirrors 33 and 34. It passes through a modulator 35, which is controlled by the output of photo-sensitive element 41, through an amplifier 42, before being deflected by a mirror 36 to return along a line parallel to the axis 2 to strike the second face 31 of the reflector 3. It is deflected from its point of impact 37 on that face to strike a point 38 on a further document 39.

As the reflector 3 rotates about its axis 2, and the document 11 is appropriately advanced, the document 11 is read in raster fashion, to provide an electrical signal significant of its tonal variations. At the same time the document 39 is scanned in raster fashion with a light beam modulated in accordance with this electrical signal. The information carried by the document 11 is thus copied onto the document 39. It will be evident to those skilled in the art that the advance arrangements for documents 11 and 13 must be appropriately synchronized, but these arrangements form no part of the present invention and will not be described here.

In the assembly of FIG. 7, the reflective surfaces 30 and 31 of the reflector 3 may be made concave, as described with reference to FIG. 6.

Figure 8:
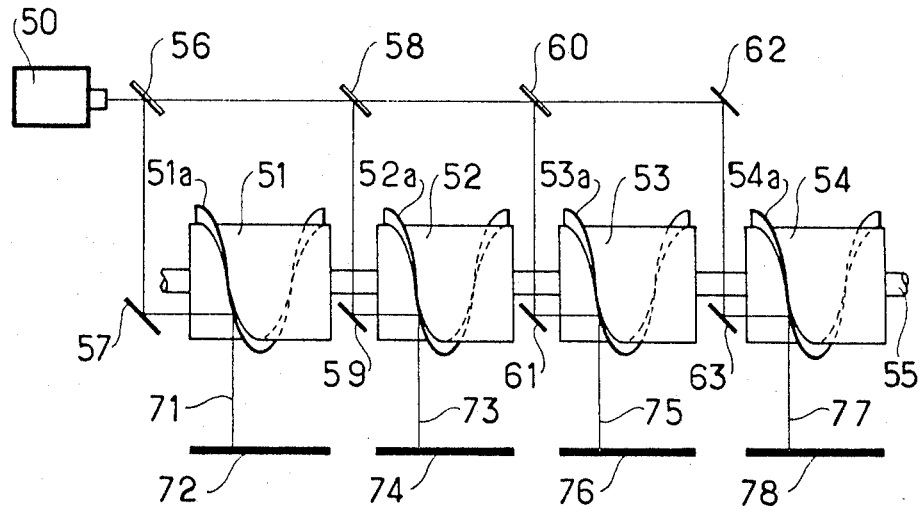

In the assembly of FIG. 8, four reflectors 51a, 52a, 53a, and 54a are mounted on respective cylindrical cores 51, 52, 53 and 54 for rotation about a common axis 55. A light source 50 provides a parallel light beam which is distributed to each reflector by semi-reflecting mirrors 56, 58, 60, and 62 co-operating with mirrors 57, 59, 61 and 63. Each reflector provides a beam, respectively 71, 73, 75 and 77 scanned across a respective documents 72, 74, 76 and 78.

This multiple scanning assembly may be provided with an optical system and photo-sensitive elements such as those of FIGS. 1, 2 or 7, to act as a facsimile transmitter. Alternatively, the light source 50 may modulated to act as a facsimile receiver for producing four copies of a received document. As another alternative, each reflector may be provided with a respective modulator so that four different images may be reproduced at one time.

It will be appreciated that the elements of the assemblies so far described can be combined in various combinations other than those specifically described, but it is not proposed to describe these further combinations here, to avoid unduly lengthening the present description.

One modification which should be mentioned is that the or each reflector may have one portion formed as a left-handed helix and the remainder formed as a right-handed helix, so that the two beams may be simultaneously scanned in opposite directions.

I claim:

1. An optical scanning assembly comprising a first reflector constructed as a cylindrical helix rotatable about the helix axis, and a light source arranged to direct a collimated light beam parallel to said helix axis to strike a first reflective surface of said reflector, so that said beam is deflected away from said axis and, upon rotation of said reflector, is scanned back and forth along a line parallel to said helix axis, wherein said reflector comprises a reflective strip wound in helix fashion around the circumference of a cylindrical core, and wherein the first reflective surface of said strip is concave, whereby said deflected beam is convergent.

2. An assembly according to claim 1, wherein said light source is a laser.

3. An assembly according to claim 1 further including a light modulator through which said beam passes so as to modulate the output of said light source.

4. An assembly according to claim 1, further including a lens and a photo-sensitive element optically coupled thereto, said lens being arranged to concentrate any reflected light from said deflected beam onto said photo-sensitive element.

5. An assembly according to claim 1, further including a convex cylindrical lens arranged parallel to said helix axis, so that said deflected beam passes through said lens at all points on its scanning path.

6. An optical scanning assembly comprising a first reflector constructed as a cylindrical helix rotatable about the helix axis, and a light source arranged to direct a collimated light beam parallel to said helix axis to strike a first reflective surface of said reflector, so that said beam is deflected away from said axis and, upon rotation of said reflector, is scanned back and forth along a line parallel to said helix axis, in which said reflector has a second reflective surface directed in a direction opposite to said first reflective surface and further including means, coupled to said light source, for providing an additional collimated light beam parallel to said helix axis and directing said additional beam to said second reflective surface, whereby a pair of light beams are scanned back and forth, upon rotation of said reflector.

7. An assembly according to claim 6, wherein said additional beam providing means comprises a beam splitter for separating said collimated beam from said light source into first and second portions, the first of which is directed to said first reflective surface and the second of which is directed to said second reflective surface.

8. An assembly according to claim 7, further including a photo-sensitive element and optical system associated therewith for receiving the deflected light of said first beam portion and further including a light modulator for receiving said additional beam of light, and including means, connected between said photo-sensitive element and said modulator, for controlling the output of said modulator in response to the light impinging upon said photo-sensitive element.

9. An assembly according to claim 6, wherein at least one of the reflecting surfaces of said strip is concave.

10. An assembly according to claim 6, wherein both of the reflecting surfaces of said strip are concave.

* * * * *